United States Patent [19]
Cheng
[11] 4,414,130
[45] Nov. 8, 1983

[54] READILY DISINTEGRABLE AGGLOMERATES OF INSOLUBLE DETERGENT BUILDERS AND DETERGENT COMPOSITIONS CONTAINING THEM

[75] Inventor: Bao-ding Cheng, Kendall Park, N.J.

[73] Assignee: Colgate Palmolive Company, New York, N.Y.

[21] Appl. No.: 209,273

[22] Filed: Nov. 21, 1980

Related U.S. Application Data

[63] Continuation of Ser. No. 715,124, Aug. 17, 1976, abandoned.

[51] Int. Cl.[3] .......................... B01J 39/14; C02F 1/42; C11D 3/12; C11D 17/06

[52] U.S. Cl. ................................ 252/140; 23/313 R; 23/313 AS; 252/174; 252/174.13; 252/174.14; 252/174.17; 252/174.18; 252/174.21; 252/174.23; 252/174.25; 252/179; 264/117

[58] Field of Search ...................... 23/313 R; 264/117; 252/89.1, 131, 135, 140, 174, 174.13, 174.14, 174.17, 174.18, 174.21, 174.23, 174.25, 174.29, 179

[56] References Cited

U.S. PATENT DOCUMENTS

| | | | |
|---|---|---|---|
| 3,227,790 | 1/1966 | Bretschneider | 264/117 |
| 3.519,570 | 7/1970 | McCarty | 252/135 |
| 3,594,325 | 7/1971 | Feierstein | 252/539 |
| 3,664,961 | 5/1972 | Norris | 252/99 |
| 3,714,051 | 1/1973 | Milesi | 252/135 |
| 3,789,002 | 1/1974 | Weber | 252/99 |
| 3,985,669 | 10/1976 | Krummel | 252/116 |
| 4,096,081 | 6/1978 | Phenicie | 252/174.25 |
| 4,274,975 | 6/1981 | Corkill | 252/140 |

FOREIGN PATENT DOCUMENTS

| | | | |
|---|---|---|---|
| 2538680 | 3/1976 | Fed. Rep. of Germany | 252/174.25 |
| 2543976 | 4/1976 | Fed. Rep. of Germany | 252/140 |
| 1248994 | 10/1971 | United Kingdom | 252/135 |
| 1503356 | 3/1978 | United Kingdom | 252/140 |

*Primary Examiner*—Dennis L. Albrecht

[57] ABSTRACT

Agglomerates of water insoluble builder molecular sieve zeolites are made by tumbling or otherwise suitably mixing very finely divided ion exchanging zeolite powder and a water soluble binder, such as starch, preferably in the presence of a small amount of moisture sufficient to promote desirable agglomeration of the finely divided ion exchanging zeolite particles and the binder into essentially spherical particles, preferably in the 6 to 140 mesh range. The agglomerates are readily disintegrated when agitated in water and rapidly release the separated very finely divided insoluble builder particles to allow them to remove hardness ions from the water. The dispersible and disintegrable agglomerates are especially useful in heavy duty detergent compositions wherein the zeolite of the agglomerate provides all or a substantial proportion of the builder content. Because of their ready disintegrability the agglomerates quickly release very finely divided ion exchanging zeolite particles, which remove calcium hardness ions from wash waters, improving detergency of the composition and at the same time, because of the very small particle size thereof, passing through laundered fabrics without depositing thereon to objectionably discolor or whiten said laundry (especially colored laundry). Because their particle size is about that of the balance of the detergent composition the builder agglomerates are also non-segregating and non-dusting. Preferred zeolites are amorphous but crystalline zeolites, of the molecular sieve type, are useful too. The amorphous zeolites are additionally useful in sorbing sticky detergent materials and allow the manufacture of free flowing and non-dusting products without the need for spray drying or other drying operations.

2 Claims, No Drawings

READILY DISINTEGRABLE AGGLOMERATES OF INSOLUBLE DETERGENT BUILDERS AND DETERGENT COMPOSITIONS CONTAINING THEM

This is a continuation of application Ser. No. 715,124 filed Aug. 17, 1976, now abandoned.

This invention relates to insoluble detergent builder materials in particulate form which has been agglomerated or otherwise formed into larger readily disintegrable particles with the aid of a binder or equivalent continuous phase material. It also relates to detergent compositions comprising such products together with particles of similar sizes containing a synthetic organic detergent and a water soluble carrier for the detergent, such as a builder or filler.

Built synthetic organic detergents based on linear higher alkyl benzene sulfonate synthetic organic detergent and pentasodium tripolyphosphate have in the past been the accepted standards for good detergent performance, the linear higher alkyl benzene sulfonate being biodegradable and an exceptionally effective detergent and the polyphosphate builder salt being a strong, yet safe builder for the detergent. However, because phosphates have in recent years fallen into some disfavor due to their suspected contribution to the eutrophication of inland lakes and rivers and because of governmental legislation and regulations enacted and implemented as a result thereof, extensive experimentation has recently been conducted with various other materials thought possibly to have building effects, among which are the carbonates, silicates, borax, trisodium nitrilotriacetate (NTA) and a host of organic sequestrants, polyelectrolytes, chelants and other products which it was thought might promote detergency of synthetic organic detergents. Unfortunately, many of such proposed replacements for phosphates, while not contributing as greatly to the eutrophication of inland waters as the phosphates are alleged to do, have been found to possess other detrimental properties. Some are poisonous, some have been suspected of contributing to the development of cancer, some are unstable on storage, some impart undesirable flow and processing properties to the product, some are malodorous and some react with other desired components of the built detergent composition. Accordingly, complete agreement has not been reached as to which of such products, if any, may be suitable phosphate replacements.

Recently it has been discovered that zeolites, especially certain synthetic amorphous zeolites and crystalline molecular sieve zeolites, preferably in at least partially hydrated condition, although water insoluble, are useful ion exchangers or ion exchange agents for calcium ion and as a result of this property, measurably improve the detergency of synthetic organic detergents, especially those of the anionic type, and are also useful with nonionic detergents. Although the water insoluble zeolites, especially the sodium aluminosilicates of such structure, are useful builders and measurably improve detergency so that they may be employed to partially replace phosphates and in some instances completely replace them as builders in commercial heavy duty detergent compositions, it has been found that because they are insoluble materials there may be a tendency for them to deactivate hardness ions more slowly then the polyphosphates, especially if they are initially in anhydrous form, and sometimes also to deposit objectionably on textiles washed with detergents containing them. In spray drying heavy duty detergent compositions it appears that the problem of insoluble zeolite depositing on washed laundry may sometimes be accentuated, apparently because in the spray drying operation the molecular sieve zeolite is formed into larger particles which do not as readily disperse (possibly because of being cemented together by silicate) as a post-added zeolite of ultimate particle size below 15 microns diameter does and therefore may be caught in the fabric and held there, sometimes whitening it, which may be objectionable when the treated fabric is dark colored and is intended to remain so. Also, because the zeolite particles are sometimes rather firmly held by the other portions of the spray dried particle matrix they are slower to be released into the wash water and therefore do not act as quickly as possible to counteract hardness ions in the water. Better building action is obtainable when zeolite particles of very fine (micron and submicron) sizes are quickly released into the wash water than is obtainable from spray dried beads containing such zeolites, especially such beads containing silicates, too. Although the possible deposition of molecular sieve zeolite powder on colored laundry does not appear to be a problem when the laundry is tumble dried after washing, in which tumbling operation the flexings of the laundry and the turbulent flow of the drying air tend to remove the molecular sieve zeolite powder from the items washed, it still represents a problem when laundry is line dried, drip dried, damp dried or hanger dried, especially after cold water washing.

Quick dispersibility of the zeolite powder is possible by separate addition of it in finely divided form to the wash water, preferably before the other detergent composition constituents. Also, it may be post-added to the other components of the detergent composition and mixed with such dry components so that separate addition to the wash water is not required. Of course, separate measurings and additions are tiresome and time consuming and do not find favor with today's homemaker. Also, separate addition of the zeolite powder to other dried detergent components can result in sifting, stratification or other segregation of the detergent components by particle size, with the molecular sieve zeolite powder usually collecting at the bottom of the box of detergent composition and thereby not being available for use in the desired proportion when the product is first employed, thus leading to negative evaluations of the product's performance as a detergent. Furthermore, the finely divided zeolite powder, when dispensed, may cause dusting problems due to its fine particle size. Such problems have been overcome by the present invention and a superior non-segregating, dust-free and effective detergent composition results which is of an attractive uniform appearance, does not have the detrimental characteristics of spray dried or post-added molecular sieve zeolite-based detergents, as previously known, and is readily manufactured by techniques conventionally employed in the detergent industry. German Offenlegungsschrift No. P 2,535,792.0 teaches the sorption of nonionic detergent on a crystalline sodium aluminosilicate but the sorbent is higher in silica content than the present sorbent and is less useful as a detergent builder.

In accordance with the present invention a readily disintegrable insoluble detergent builder particulate agglomerate comprises a plurality of finely divided synthetic zeolite builder particles of formula $(Na_2O)_x.(Al_2O_3)_y.(SiO_2)_z.wH_2O$ wherein x is 1, y is from 0.8 to 1.2, preferably about 1, z is from 1.5 to 3.5, preferably 2 to 3 or about 2 and w is from 0 to 9, preferably 2.5 to 6, held together by a water soluble binder, with the agglomerate particles being substantially within the 4 to 180 mesh range or a part of said range which is the same as or like that for a complementing portion of a detergent composition which is spray dried. Also within the invention are the described spray dried product including the mentioned particulate detergent builder agglomerate and a method for the manufacture of such agglomerate. While the use of water soluble binders is highly preferred, it is also possible to use fusible binders, which melt or otherwise break apart at the temperature of the wash water but if employed such are usually used with a water soluble component, too.

The zeolites utilized in the present invention include the crystalline, amorphous and mixed crystalline-amorphous zeolites of natural or synthetic origin or mixtures thereof that can be of satisfactorily quick and sufficiently effective hardness ion counteracting activity. Preferably, such materials are able to react sufficiently rapidly with a hardness cation such as one of calcium, magnesium, iron and the like, to soften wash water before adverse reactions of such hardness ions with the synthetic organic detergent component of detergent compositions made according to the present invention. A useful range of calcium ion exchange capacities is from about 200 milligram equivalents of calcium carbonate hardness per gram of aluminosilicate to 400 or more of such milligram equivalents (on an anhydrous basis). Preferably such range is of about 250 to 350 milligram equivalents per gram.

The water insoluble crystalline aluminosilicates used are often characterized by having a network of substantially uniformly sized pores in the range of about 3 to 10 Angstroms, often being about 4 Å (nominal), such size being uniquely determined by the unit structure of the zeolite crystal. Of course, zeolites containing two or more such networks of different pore sizes can also be satisfactorily employed, as can mixtures of such crystalline materials with each other, and with amorphous materials, etc.

The zeolite should be a univalent cation-exchanging zeolite, i.e., it should be an aluminosilicate of a univalent cation such as sodium, potassium, lithium (when practicable) or other alkali metal, or ammonium. Preferably the univalent cation of the zeolite molecular sieve is an alkali metal cation, especially sodium or potassium and most preferably, is sodium, but various other types are also useful.

Crystalline types of zeolite utilizable as molecular sieves in the invention, at least in part, include zeolites of the following crystal structure groups: A, X, Y, L, mordenite, and erionite, of which types A and X are preferred. Mixtures of such molecular sieve zeolites can also be useful, especially when type A zeolite is present. These crystalline types of zeolites are well known in the art and are more particularly described in the text *Zeolite Molecular Sieves* by Donald W. Breck, published in 1974 by John Wiley & Sons. Typical commercially available zeolites of the aforementioned structural types are listed in Table 9.6 at pages 747–749 of the Breck text, which table is incorporated herein by reference.

Preferably the zeolite used in the invention is synthetic and it is also preferable that it be of type A or similar structure, particularly described at page 133 of the aforementioned text. Good results have been obtained when a Type 4A molecular sieve zeolite is employed, wherein the univalent cation of the zeolite is sodium and the pore size of the zeolite is about 4 Angstroms. Such zeolite molecular sieves are described in U.S. Pat. No. 2,882,243, which refers to them as Zeolite A.

Molecular sieve zeolites can be prepared in either a dehydrated or calcined form which contains from about 0 or about 1.5% to about 3% of moisture or in a hydrated or water loaded form which contains additional bound water in an amount from about 4 up to about 36% of the zeolite total weight, depending on the type of zeolite used. The water-containing hydrated form of the molecular sieve zeolite is preferred in the practice of this invention when such crystalline product is used. The manufacture of such crystals is well known in the art. For example, in the preparation of Zeolite A, referred to above, the hydrated zeolite crystals that are formed in the crystallization medium (such as a hydrous amorphous sodium aluminosilicate gel) are used without the high temperature dehydration (calcining to 3% or less water content) that is normally practiced in preparing such crystals for use as catalysts, e.g., cracking catalysts. The crystalline zeolite, in either completely hydrated or partially hydrated form, can be recovered by filtering off the crystals from the crystallization medium and drying them in air at ambient temperature so that their water contents are in the range of about 5 to 30% moisture, preferably 15 to 22%. However, because of the method of manufacture of the present invention the moisture content of the molecular sieve zeolite being employed may be even as low as 0 percent at the start of the manufacturing process because during the blending with binder material (when water is also present) the zeolite is converted to a more desirable, at least partially hydrated state.

The zeolites used as molecular sieves should often also be substantially free of adsorbed gases, such as carbon dioxide, since such gas-containing zeolites can produce undesirable foaming when the zeolite-containing detergent is contacted with water; however, sometimes the foaming is tolerated and may be desirable.

Preferably the zeolite should be in a finely divided state with the ultimate particle diameters being below 15 microns, e.g., 0.005 to 15 microns, preferably being from 0.01 to 10 microns and especially preferably of 0.01 to 8 microns mean particle size, e.g., 4 to 8 microns, if crystalline and 0.01 to 0.1 micron, e.g., 0.01 to 0.05 microns, if amorphous.

Although the crystalline synthetic zeolites are more common and better known, amorphous zeolites may be employed instead and are often superior to the crystalline materials in various important properties, as will be described, as may be mixed crystalline-amorphous materials and mixtures of the various types of zeolites described. The particle sizes and pore sizes of such materials will usually be like those previously described but variations from the described ranges may be made, providing that the materials function satisfactorily as builders and do not objectionably overwhiten dyed materials with which they are treated in aqueous media. Various suitable crystalline molecular sieve zeolites are described in my U.S. patent applications Ser. Nos. 467,688, filed May 7, 1974; 503,734, filed Sept. 6, 1974; and 640,793 and 640,794, filed Dec. 15, 1975, all of which are hereby incorporated by reference for such descriptions and for descriptions therein of other materials within this invention. Other useful such molecular sieve zeolites are illustrated in German Offenlegungsschriften Nos. 2,412,837 and 2,412,839 and in Austrian patent applications A3277/73; A4012/73; A5458/73; A5757/73; A7160/73; A8001/73; A8237/73; A9450/73, all of which are also incorporated herein by reference. A preferred ion exchange zeolite is the amorphous zeolite of Belgian Pat. No. 835,351 of the formula $$M_2O.Al_2O_3.(SiO_2)_z.wH_2O$$

wherein z is from 2.0 to 3.8 and w is from 2.5 to 6, especially when M is sodium. Such patent is also incorporated herein by reference to avoid the necessity for lengthy recitations of such materials, methods for their manufacture and uses, etc.

The water soluble binders employed to agglomerate or otherwise hold together the finely divided zeolite builder particles are binding substances which satisfactorily hold such particles together when they are dried or substantially dry, e.g., of free moisture contents of less than 5%, (not counting water of hydration or water held by the zeolite) but rapidly dissolve and release such particles when the agglomerates are plunged into contact with an aqueous medium, such as the wash water. Such effect is obtained over usual storage condition temperature and use temperature ranges, such as −20° to 40° C. and 10° to 80° C., respectively. The binders, as described herein, are water soluble crystalline or non-crystalline materials which meet the mentioned test, keeping the agglomerated particles intact during normal handling, as when the product is being filled and shipped, and yet permitting or promoting rapid dissolution of the binder and dispersion of the finely divided molecular sieve zeolite particles in sizes like their ultimate particle sizes when brought into contact with water. The dissolution speed is such that the molecular sieve zeolites have the described quick calcium—"neutralizing" action at the speed previously mentioned. The rapidities of solution of the binder and dispersion of the zeolite particles may be increased by utilizing in the agglomerate (or in the balance of the composition or part in each) an effervescing material or mixture so that rupturing of any agglomerate particles will be aided by the development of effervescence and dissolving and dispersion of the particle components will thereby be even more rapidly achieved. Thus, sodium carbonate or preferably sodium bicarbonate may be combined with the exchange zeolite binder mix and the balance of the detergent composition may include citric acid, monosodium phosphate, boric acid or other suitable acidifying material, preferably encapsulated or agglomerated with the bicarbonate, for reaction with it to generate carbon dioxide.

The preferred binders are the water soluble starches, salts, gums, sugars, polymers and nonionic surface active materials and mixtures of different types of such materials within a particular class and mixtures of types from different classes, either two or more, may be employed. Of the binders starches are preferred because of their very favorable combination of good binding and fast dispersing properties. Starches usually occur as discrete particles or granules having diameters in the 2 to 150 microns range and while most of the starches contain from 22 to 26% of amylose and 74 to 70% of amylopectin, some starches, such as waxy corn starches, may be entirely free of amylose. It is intended to include within the term "starch" the various types of natural starches, including corn starch, potato starch, tapioca, cassava and other tuber starches, as well as amylose and amylopectin separately or in mixtures. Furthermore, it is also intended that such term stand for hydroxy-lower alkyl starches, hydroxyethyl starch, hydroxylated starches, starch esters, e.g., starch glycollates, and other derivatives of starch having essentially the same properties, e.g., partially hydrolyzed starches, and similarly such derivatives of the major amylose and amylopectin components of the starch are also included within the description. Related cellulosic compounds and derivatives thereof are included herein within the class of gums, and related carbohydrates, such as sugars (hydrolysis products) are also separately classified herein. Lower, as used above, means from 1 to 4 carbon atoms.

Starches are particularly useful in the practice of the present invention because they form thick aqueous solutions which have adhesive properties and therefore can be readily employed to agglomerate the molecular sieve zeolite particles. Yet, such agglomerated particles, upon drying or sorption of moisture from the starch solution by the zeolite, can be broken apart into pieces of desired size (alternatively they can be controllably agglomerated to such particle sizes) for use with similarly sized complementary detergent composition particles. Although they are excellent agglomerating means and can serve as a continuous phase which may include desirable small size particles between zeolite sieve particles, when such agglomerated particles are placed in water the starch swells, sufficiently weakening the bond to allow it to be broken by the action of the agitated water and thereby rapidly dispersing the insoluble particles in the wash water. In addition to its desirable adhesive and dissolving properties starch is very useful in the present application because it is harmless in the product itself and when discharged into sewers and ultimately, into inland waters.

Gums and mucilages, included here within the meaning of gums, are carbohydrate polymers of high molecular weight, obtainable from plants but also able to be made synthetically. Most of them can be dispersed in cold water to produce viscous mucilaginous solutions which do not gel but it is intended to include within the meaning of the word gum herein those materials which may be made synthetically and those which can also gel. Among some of the plant gums that are of commercial importance may be mentioned arabic, ghatti, karaya and tragacanth, among those normally classified as plant gums, and guar, linseed, locust bean gums and mucilages. The seaweed mucilages or gums such as agar, align and carrageenin, are also included within this group, as are the gum-like polysaccharides of the hemicellulose group of carbohydrate polymers having a high pentosan content.

Among the synthetic gums the most favored are the carboxymethyl cellulose such as sodium carboxymethyl cellulose, which also has a strong anti-redeposition action in detergent compositions. Other synthetic gums which act as anti-redeposition agents of this type include hydroxypropyl cellulose, methyl and ethyl celluloses, hydroxymethypropyl cellulose and hydroxyethyl cellulose.

Sugars, such as sucrose and corn syrup are also useful water soluble materials and for them there can be substituted various others of the known pentoses and glucoses. The polymeric materials are those (except for surface active polymeric materials) which are composed of a multiplicity of the same (or different) monomeric groups and the term is intended to be employed as a residual class, excluding the starches, gums and sugars. Thus, various water soluble polymeric materials are included within this group, such as the commercial preparations Polyclar®, (a polyvinylpyrrolidone, made by GAF Corp.). Carbopol®(B. F. Goodrich Chemical Co.) and Carbowax®(Union Carbide Corp.). However, the most preferred of the synthetic polymers is polyvinyl alcohol, alone or in mixture with polyvinyl acetate. Such product is especially desirable because it too, like sodium carboxymethyl cellulose (and PVP too, to some extent), possesses excellent anti-redeposition properties, helping to hold laundry soil dispersed in suspension without having it redeposited on washed laundry. Also, polyacrylamide may be used in partial or complete replacement of one or more of the other mentioned polymers.

Among the various salts that may be employed it is most desirable to utilize those which have sufficient film strength to satisfactorily hold together particular zeolite particles used. Among these are the various phosphates, carbonates, sulfates, halides, bicarbonates, bisulfates, pyrophosphates, triphosphates, polyphosphates, pyrophosphates and borates, especially such salts of inorganic salt-forming metallic ions, e.g., the alkali metal salts. In place of the alkali metal salts, of which sodium is preferred, various other salt-forming ions may also be utilized, such as the triethanolamine salts, diethanolammonium salts and ammonium salts. Most preferred to the mentioned salts are pentasodium tripolyphosphate, tetrasodium pyrophosphate, tetrapotassium pyrophosphate, sodium carbonate, sodium bicarbonate, sodium sulfate, potassium sulfate, ammonium sulfate, sodium chloride, potassium chloride, borax, and sodium bisulfate. Normally the salts will be present in at least partially hydrated form, with the crystals being formed serving to join together the component zeolite particles, but anhydrous or partially hydrated salts may be utilized and the hydration or partial hydration thereof may be effected in situ. The various builder and filler salts normally employed in detergent compositions are desirably utilized to hold the zeolite particles together because they also perform useful functions in the final detergent composition with which the aggregates are preferably ultimately incorporated.

The nonionic surface active materials are described at length in McCutcheon's *Detergents and Emulsifiers*, 1973 Annual and in *Surface Active Agents*, Vol. II, by Schwartz, Perry and Berch (Interscience Publishers, 1958), the descriptions of which are herein incorporated by reference. Such nonionic surface active agents, preferably nonionic detergents, are usually pasty or waxy solids at room temperature (20° C.) which are either sufficiently water soluble to dissolve promptly in water or will quickly melt at the temperature of the wash water, as when that temperature is above 40° C. The nonionic surface active agents employed will not usually be those which are very fluid at room temperature because such might tend to make a tacky agglomerate which would be poorly flowing and might lump or set on storage. Typical useful nonionic detergents are the poly-(lower alkenoxy) derivatives that are usually prepared by the condensation of lower (2 to 4 carbon atoms) alkylene oxide, e.g., ethylene oxide, propylene oxide (with enough ethylene oxide to make a water soluble product), with a compound having a hydrophobic hydrocarbon chain and containing one or more active hydrogen atoms, such as higher alkyl phenols, higher fatty acids, higher fatty mercaptans, higher fatty amines and higher fatty polyols and alcohols, e.g., fatty alcohols having 8 to 20 or 10 or 12 to 18 carbon atoms in an alkyl chain and alkoxylated with an average of about 3 to 30, preferably 6 to 20 lower alkylene oxide units. Preferred nonionic surfactants are those represented by the formula $RO(C_2H_4O)_nH$, wherein R is the residue of a linear saturated primary alcohol (an alkyl) of 12 to 18 carbon atoms and n is an integer from 6 to 20. Typical commercial nonionic surface active agents suitable for use in the invention include Neodol®45-11, which is an ethoxylation product (having an average of about 11 ethylene oxide units) of a 14 to 15 carbon atom (average) chain fatty alcohol (made by Shell Chemical Company); Neodol 25-7, a 12 to 15 carbon atom chain fatty alcohol ethoxylated with an average of 7 ethylene oxide units; and Alfonic®1618-65, which is a 16 to 18 carbon alkanol ethoxylated with an average of 10 to 11 ethylene oxide units (Continental Oil Company). Also useful are the Igepals® of GAF Co., Inc. In the above description higher, as applied to higher alkyl, higher fatty, etc., means from 8 to 20, preferably from 12 to 18. Also, supplementing or replacement proportions of amphoteric or anionic surface active agents may be used with or in replacement of some of the nonionic or sometimes, of all of it.

In place of the individual binders mixtures of two or more thereof may be utilized. In some cases these will be highly desirable, as when the mixture is that of a supplementing detergent (nonionic surface active agent), anti-redeposition agent (starch or sodium carboxymethyl cellulose) and supplementing builder salts (STPP or $Na_2CO_3$) or any two thereof. In such cases the presence of such materials with the insoluble molecular sieve zeolite, rather than bound with various other detergent composition constituents, promotes quick solution of the materials (and the nonionic surface active agent further speeds this process) to have the wetting effect of the nonionic surface active agent, the additional calcium sequestering effect of any builder salt and the anti-redeposition effect of the sodium carboxymethyl cellulose or equivalent gum obtainable before dissolution of a major proportion of the detergent composition, the complementary portion, that containing the synthetic organic detergent and soluble builder or filler salt. Of course, some sodium carboxymethyl cellulose or starch may be included in the complementary portion of the composition, as may be a proportion of zeolite builder, supplementary builder, nonionic surface active agent and various other materials, as may be desired, to balance the properties of the product. Also, to balance such properties some ingredients of the normal complementary part may be included with the zeolite agglomerate, too.

The water soluble synthetic organic detergent employed in the present detergent compositions may include anionic, nonionic, cationic and amphoteric detergents but cationics will usually be omitted. Ampholytic and amphoteric detergents are normally not as effective as anionic and nonionic detergents and accordingly, the anionics, nonionics and mixtures of anionics with nonionics are best in the separately spray dried complementing portions of the detergent composition of this invention. Descriptions of various materials of the mentioned detergent classes are found in McCutcheon's

*Detergents and Emulsifiers,* 1973 Annual and in *Surface Active Agents,* previously mentioned.

Suitable anionic water soluble surfactants include higher (8 to 20 or 12 to 18 carbon atom)alkyl benzene sulfonate salts, preferably higher alkyl benzene sulfonates wherein the alkyl group contains 10 to 16 carbon atoms. The alkyl group is preferably linear and especially preferred are those of average alkyl chain lengths of about 11 to 13 or 14 carbon atoms.

Preferably also, the alkyl benzene sulfonate has a high content of 3- (or higher) phenyl isomers and a correspondingly low content (well below 50%) of 2- (or lower) phenyl isomers; in other terminology, the benzene ring is preferably attached in large part at the 3 or higher (e.g., 4, 5, 6 or 7) position of the alkyl group and the content of isomers in which the benzene ring is attached at the 2 or 1 position is correspondingly low. One suitable type of such detergent is described in U.S. Pat. No. 3,320,174. However, terminally alkylated LAS detergents are also used.

Also typical of the useful anionic detergents are the olefin sulfonate salts. Generally they contain long chain alkenyl sulfonates or long chain hydroxyalkane sulfonates (with the OH being on a carbon atom which is not directly attached to the carbon atom bearing the $-SO_3$ group). More usually, the olefin sulfonate detergent comprises a mixture of these two types of compounds in varying amounts, often together with long chain disulfonates or sulfate-sulfonates. Such olefin sulfonates are described in many patents, such as U.S. Pat. Nos. 2,061,618; 3,409,637; 3,332,880; 3,420,875; 3,428,654; 3,506,580; and British Pat. No. 1,139,158, and in the article by Baumann et al. in Fette-Seifen-Anstriehmittel, Vol. 72, No. 4, at pages 247-253 (1970). All the above-mentioned disclosures are incorporated herein by reference. As indicated in these patents and the published literature, the olefin sulfonates may be made from straight chain alpha-olefins, internal olefins, olefins in which the unsaturation is in a vinylidene side chain (e.g., dimers of alpha-olefin), etc., or more usually, mixtures of such compounds, with the alpha-olefin usually being the major constituent. The sulfonation is usually carried out with sulfur trioxide under low partial pressure, e.g., $SO_3$ highly diluted with inert gas such as air or nitrogen or under vacuum. This reaction generally yields an alkenyl sulfonic acid, often together with a sultone. The resulting acidic material is generally then made alkaline and treated to open the sultone ring to form hydroxyalkane sulfonate and alkenyl sulfonate. The number of carbon atoms in the olefin is usually within the range of 10 to 25, more commonly 12 to 20, e.g., a mixture of principally $C_{12}$, $C_{14}$ and $C_{16}$, having an average of about 14 carbon atoms or a mixture of principally $C_{14}$, $C_{16}$ and $C_{18}$, having an average of about 16 carbon atoms.

Another class of water soluble synthetic organic anionic detergents includes the higher (10 to 20 carbon atoms) paraffin sulfonates. These may be the primary paraffin sulfonates made by reacting long chain alpha-olefins and bisulfite, e.g., sodium bisulfite, or paraffin sulfonates having the sulfonate groups distributed along the paraffin chain, such as the products made by reacting a long chain paraffin with sulfur dioxide and oxygen under ultraviolet light, followed by neutralization with NaOH or other suitable base (as in U.S. Pat. Nos. 2,503,280; 2,507,088; 3,260,741; 3,372,188; and German Pat. No. 735,096). The hydrocarbon substituent of the paraffin sulfonate preferably contains 13 to 17 carbon atoms and the paraffin sulfonate will normally be a monosulfonate but, if desired, may be a di-, tri- or higher sulfonate. Typically, a paraffin disulfonate may be employed in admixture with the corresponding monosulfonate, for example, as a mixture of mono- and di-sulfonates containing up to about 30% of the disulfonate.

The hydrocarbon substituent of the paraffin sulfonate will usually be linear but branched chain paraffin sulfonates can also be employed. The paraffin sulfonate used may be terminally sulfonated or the sulfonate substituent may be joined to the 2-carbon or other carbon atom of the chain. Similarly, any di- or higher sulfonate employed may have the sulfonate groups distributed over different carbons of the hydrocarbon chain.

Other anionic detergents that can be used are the water soluble salts or soaps of, for example, such higher fatty carboxylic acids as lauric, myristic, stearic, oleic, elaidic, isostearic, palmitic, undecylenic, tridecylenic, pentadecylenic, 2-lower alkyl higher alkanoic (such as 2-methyl tridecanoic, 2-methyl pentadecanoic or 2-methyl heptadecanoic) or other saturated or unsaturated fatty acids of 10 to 20 carbon atoms, preferably of 12 to 18 carbon atoms. Soaps of dicarboxylic acids may also be used, such as the soaps of dimerized linoleic acid. Soaps of such other higher molecular weight acids as rosin or tall oil acids, e.g., abietic acid, may be employed. One specific suitable soap is the soap of a mixture of tallow fatty acids and coconut oil fatty acids (e.g., in 85:15 ratio). For the purpose of this specification the soaps will be considered in the class of synthetic detergents.

Other anionic detergents are sulfates of higher alcohols, such as sodium lauryl sulfate, sodium tallow alcohol sulfate, sulfated oils, or sulfates of mono- and diglycerides of higher fatty acids, e.g., stearic monoglyceride monosulfate; higher alkyl poly (lower alkenoxy) ether sulfates, i.e., the sulfates of the condensation products of a lower (2 to 4 carbon atoms) alkylene oxide, e.g., ethylene oxide, and a higher aliphatic alcohol, e.g., lauryl alcohol, wherein the molar proportion of alkylene oxide to alcohol is from 1:1 to 5:1 or 30:1; lauryl or other higher alkyl glyceryl ether sulfonates; and aromatic poly-(lower alkenoxy) ether sulfates such as the sulfates of the condensation products of ethylene oxide and nonyl phenol (usually having 1 to 20 oxyethylene groups per molecule and preferably, 2 to 12). The ether sulfate may also be one having a lower alkoxy (of 1 to 4 carbon atoms, e.g. methoxy), substituent on a carbon close to that carrying the sulfate group, such as a monomethyl ether monosulfate of a long chain vicinal glycol, e.g., a mixture of vicinal alkane diols of 16 or 17 to 18 or 20 carbon atoms in a straight chain.

Additional water soluble anionic surfactants include the higher acyl sarcosinates, e.g., sodium lauroyl sarcosinate; the acyl esters, e.g., oleic acid esters, of isethionates; and acyl N-methyl taurides, e.g., potassium N-methyl lauroyl- or oleyoyl taurides. Another type of anionic surfactant is a higher alkyl phenol sulfonate, for example, a higher alkyl phenol disulfonate, such as one having an alkyl group of 12 to 25 carbon atoms, preferably a linear alkyl of about 16 to 22 carbon atoms, which may be made by sulfonating the corresponding alkyl phenol to a product containing in excess of 1.6, preferably above 1.8, e.g., 1.8 to 1.9 or 1.95 $SO_3H$ groups per alkyl phenol molecule. The disulfonate may be one whose phenolic hydroxyl group is blocked, as by etherification or esterification; thus the H of the phenolic OH may be replaced by an alkyl, e.g., ethyl or hydroxyalkoxyalkyl, e.g., a $—(CH_2CH_2O)_xH$ group in which x is 1 or more, such as 3, 6 or 10, and the resulting alcoholic OH may be esterified to form, say, a sulfate, e.g., $—OSO_3Na$.

While the aforementioned structural types of organic carboxylates, sulfates and sulfonates are generally preferred, the corresponding organic phosphates and phosphonates are also useful as anionic detergents.

Generally, the anionic detergents are salts of alkali metals, such as potassium and especially sodium, although salts of ammonium cations and substituted ammonium cations derived from lower (2 to 4 carbon atoms) alkanolamines, e.g., triethanolamine, tripropanolamine, diethanol monopropanolamine, and from lower (1 to 4 carbon atoms) alkylamines, e.g., methylamine, ethylamine, secbutylamine, dimethylamine, tripropylamine and tri-isopropylamine, may also be utilized.

Of the anionic detergents the alkali metal salts of sulfated and sulfonated oleophilic moieties are preferred over the carboxylic, phosphoric and phosphonic compounds.

The nonionic detergent or surface active agent utilized with the complementary material and often present in relatively minor quantity in the crutcher mix when such is spray dried is of the type previously described as a suitable binder.

Amphoteric organic surfactants are generally higher fatty carboxylates, phosphates, sulfates or sulfonates which contain a cation substituent such as an amino group which may be quaternized, for example, with lower alkyl groups, or may have the chain thereof extended at the amino group by condensation with a lower alkylene oxide, e.g., ethylene oxide. In some instances the amino group may be a member of a heterocyclic ring. Representative commercial water soluble amphoteric organic detergents include Deriphat ®151, which is sodium N-coco beta-aminopropionate (General Mills, Inc.) and Miranol ®C2M (anhydrous acid), which is the anhydrous form of the heterocyclic diaminodicarboxylic compound of the formula

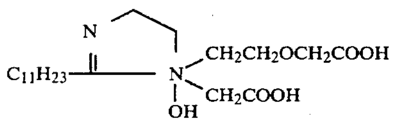

(Miranol Chemical Co., Inc.).

Cationic organic surfactants include quaternary amines having a water soluble anion such as acetate, sulfate or chloride. Suitable quaternary ammonium salts may be derived from a higher fatty primary amine by condensation with a lower alkylene oxide similar to that described above for preparation of nonionic surfactants. Typical cationic surfactants of this type include Ethoduomeens ®T/12 and T/13, which are ethylene oxide condensates of N-tallow trimethylene diamine (Armour Industrial Chemical Co.) and Ethoquad ®18/12, 18/25 and 0/12 which are polyethoxylated quaternary ammonium chlorides (Armour Industrial Chemical Co.). Cationic surfactants also include quaternary ammonium salts derived from heterocyclic aromatic amines such as Emcol ®E-607 which is N-(lauryl colamino formyl methyl) pyridinium chloride (Witco Chemical Corp.). Also sometimes classified as cationic surfactants are higher fatty amine oxides such as Aromox ®18/12 which is bis(2-hydroxyethyl) octadecylamine oxide (Armour Industrial Chemical Co.) but such are better considered to be nonionic.

The carrier for the synthetic organic detergent, preferably for one of the anionic type, will usually be a builder or filler. Representative of the inorganic builders which may be incorporated with the detergent are the water soluble silicates, e.g., alkali metal silicates wherein the molar ratio of metal oxide:$SiO_2$ is about 1:1 or 1:1.5 to 1:3.2, preferably 1:2.0 to 1:2.5, e.g., of $Na_2O$:$SiO_2$ ratio of 1:2.4, alkali metal polyphosphate salts, such as pentasodium tripolyphosphate and tetrasodium pyrophosphate, borates, such as borax and alkali metal carbonates, such as sodium carbonate and sodium bicarbonate. Normally hydrates of the salts are present in the product but anhydrides may also be used. When phosphates are to be omitted from the formula usually silicates or carbonates alone or in mixture are desirably employed as the inorganic builder salts. In addition to the inorganic builders organic builder salts may be utilized, such as alkali metal salts of nitrilotriacetic acid, citric acid, 2-hydroxyethyleneiminodicarboxylic acid, boroglucoheptanoic acid, polycarboxylic acids, e.g., polymaleates of lower molecular weight (generally below 1,000, e.g., 400, 600 or 800), and polyphosphonic acids, preferably all as their sodium salts. Also useful as carriers are alkali metal sulfates, bisulfates and chlorides, usually of sodium, as fillers and organic fillers or solubilizers, too, e.g., urea.

With the detergent composition, in addition to the main agglomerate components, the molecular sieve zeolite and the binder, and the complementing separate spray dried particles which include synthetic organic detergent and filler and/or builder, various other adjuvants may be present, usually preferably incorporated in the spray dried portion of the product except for those which may be heat sensitive or are for improving flow properties. Among such adjuvants are conventional functional and aesthetic adjuvants such as bleaches, e.g., sodium perborate; colorants, e.g., pigments, dyes and optical brighteners; foam stabilizers, e.g., alkanolamides, such as lauric myristic diethanolamides; enzymes, e.g., proteases; skin protecting and conditioning agents, such as water soluble proteins of low molecular weight, obtained by hydrolysis of proteinaceous materials such as animal hair, hides, gelatin, collagen (such materials may also be employed as binders); foam destroyers, e.g., silicones; fabric softeners, e.g., ethoxylated lanolin; bactericides, e.g., hexachlorophene; opacifying agents, e.g., polystyrene suspensions, behenic acid; buffering agents, e.g., alkali metal borates, acetates, bisulfates; perfumes; and flow improving agents, e.g., ground clays.

The proportions of finely divided ion exchanging zeolite builder particles and water soluble binder in the agglomerate particles will usually be from 10 to 90% of the zeolite and 10 to 90% of the binder, preferably 20 to 80% and 20 to 80% and more preferably 30 to 70% and 30 to 70%. Most preferably, there will be no other component except possibly minor adjuvants such as perfumes and flow promoting materials and the total thereof will be no more than 5% of the agglomerate particles. However, in some cases as much as 10 or 20% of adjuvants may be present, especially in those cases wherein the product is to be a component of a bleaching detergent composition or is to be used with such a composition and the bleaching material is sensitive to heat, so that it cannot be efficiently spray dried with the separate particles. In fact, as much as 50% or so of perborate, percarbonate or peroxymonosulfate bleaching agent may be present. In the absence of any such adjuvants the total of the two components of the agglomerate particles is 100%, exclusive of any free moisture present. The weights of components of the agglomerate particles mentioned above are taken as is, including water of hydration of the zeolite and water tied up with zeolite or binder. However, to prevent the product from being tacky, sticky and poorly flowing the amount of free moisture is desirably limited to 10%, is preferably less than 5% and in many cases will be no more than 3%.

The spray dried separate particles of the product will normally contain synthetic organic detergent, preferably of the anionic type, e.g., LAS, builder and/or filler and any other adjuvants that may be present. Usually the heat stable adjuvants will be incorporated in the spray dried particles so as to make them into unitary mobile particles of satisfactory flow properties and appearance. Although spray drying is highly preferred, the separate particles may also be made by other methods, including spray cooling, drum drying, tray drying, air drying and drying by hydration of anhydrous components of a fluid mix. In utilizing these various methods oversize particles or lumps may be size reduced to the desired size range and undersize particles may be reworked. Normally the proportions of components in the separate beads will be from 5 to 40% of the synthetic organic detergent, preferably 10 to 25% thereof, 10 to 60% of builder salt, preferably 15 to 40% thereof and 10 to 80% of filler salt, preferably 20 to 60% thereof, often with from 1 or 2 to 10 or 20% of adjuvants, most or all of which will be limited to 5% and preferably to 2% of the separate beads.

The proportion of agglomerate particles to separate particles may be varied as desired to produce the most acceptable detergent composition but usually such proportion will be in the range of 1:10 to 5:1, preferably 1:10 to 4:1 and more preferably 1:5 to 3:1. The compositions of the detergents made are considered to be better described by a total formula for them, as they are obtained by mixing together the agglomerate and separate particles. In such a composition the desired content of synthetic organic detergent will usually be from 5 to 35%, preferably 5 to 25% and more preferably 10 to 25%, with the content of builder salt (excluding the zeolite) being from 10 to 60%, preferably 15 to 40%, the content of filler salt being about 10 or 15 to 60%, preferably 20 to 40%, that of ion exchanging zeolite being about 5 to 50%, preferably 5 to 40% and more preferably about 10 to 30% and that of binder, which may also function as anti-redeposition agent, being about 0.5 to 20%, preferably 1 to 15% and more preferably about 5 to 10%. Thus, preferred non-phosphate compositions may comprise from 5 to 25% of higher linear alkylbenzene sulfonate wherein the higher alkyl is of 12 to 18 carbon atoms, about 5 to 20% of sodium silicate of $Na_2O:SiO_2$ ratio in the range of 1:1 to 1:3.2, about 15 to 60% of sodium sulfate, about 5 to 40% of ion exchanging zeolite and about 0.5 to 20% of starch or nonionic detergent binder, with such percentages being 8 to 15, 5 to 15, 20 to 50, 10 to 30 and 2 to 10%, respectively for preferred formulations, in which formulations the LAS is sodium linear alkyl benzene sulfonate wherein the alkyl is of 12 to 15 carbon atoms. Such formulas may be varied by having some or all of the sodium silicate replaced by sodium carbonate when it is the objective to make a non-phosphate detergent or by pentasodium tripolyphosphate or other suitable polyphosphate when the presence of phosphate builders is allowable. Also, an additional proportion of 5 to 40% of such phosphate, preferably 10 to 25% thereof, may be added to the other components (of the nonphosphate formulas) for the manufacture of phosphate detergents, in which cases proportions of sodium silicate and sodium carbonate, if present, may be diminished, for example, to half the values given above.

The method for manufacture of the agglomerate particles in the desired range of particle sizes requires no more than mixing the finely divided ion exchanging zeolite builder particles with particles of the water soluble binder in such a condition as to promote aggregation. Thus, such binder particles or the zeolite particles may be pre-moistened or otherwise treated with a solvent material, preferably aqueous and more preferably water, which will help the binder to adhere to the particles of zeolite and thereby hold them together. In one preferred form of the invention the particles of both materials are blended together with a fine spray of water or a cloud of steam being directed onto their moving surfaces, which sufficiently moistens the binder and dissolves some of it at the surfaces thereof to promote adhesion of it to a plurality of particles of zeolite. By control of the mixing speed, the temperature and the proportion of water or other solvent employed, the extent of adhesion may be regulated and the sizes of particles produced within a certain time period may also be controlled. Thus, in a preferred aspect of the invention the nonionic surface active condensate previously described, starch, sodium carboxymethyl cellulose, polyvinyl alcohol, polyvinyl pyrrolidone or polyacrylamide or a mixture of any or all of these may be tumbled with the very fine zeolite particles in the presence of moisture, e.g., initially from 2 to 30% free moisture, to produce particles of the desired size and these may be further classified or screened to remove those outside specification. During the tumbling, especially when anhydrous or only partially hydrated ion exchanging zeolite is employed or when a hydratable salt is utilized as the binder, free moisture may be removed and the product may set up so as to be loosely held together in a mass which may be size reduced to the desired particle size range. Alternatively, a concretion of the molecular sieve and binder component in water may be created and after completion of mixing this may be dried, if necessary, and broken up to desired shape and size. The various particles may be rounded by rolling in a mill to round off rough edges and the oversize material may be size reduced to sizes of the desired range, with the undersize materials being reworked. In another aspect of the invention the molecular sieve and binder may be mixed together in suitable condition for agglomeration and the agglomerate may be dried on any of various types of dryers, including drum dryers, film dryers and tunnel dryers, before being size reduced or classified to the desired size range. In the agglomerating operation desirable adjuvants may be added, such as perfume, dyes, pigments, etc., to give the agglomerate particles a desired aroma or appearance, sometimes contrasting with that of the other detergent particles (the separate particles) but usually being about the same as them in appearance. Agglomerate particles may also be made by overspraying (as by spraying dissolved or molten nonionic detergent onto a moving bed of zeolite particles). Co-spraying and spray drying are also among methods that are useful. The zeolite particles may be agglomerated as supplied (in sizes greater than ultimate particle size), may be agglomerated before being mixed with binder and may be agglomerated with a mixture of binders, e.g., nonionic detergent plus hydrous silicate builder salt or plus tripolyphosphate or plus both.

The separate particles are preferably made by spray drying in the nomral manner, such as by spraying a crutcher mix normally containing about 40 to 70% solids in an aqueous medium, through a narrow orifice, e.g., one of 0.5 to 2 mm. diameter, at a temperature of about 50° to 140° C. at a pressure of 100 to 800 lbs./sq. in. into a drying gas at a temperature of 200° to 500° C. to produce spray dried globular particles having a moisture content which is usually in the range of about 2 L to 12%. Such particles are classified to the desired particle size range and are merely blended with agglomerate particles, as in a drum mixer, to produce the desired product. The separate particles may also be made by other known methods than spray drying, e.g., by drum drying, dry mixing, etc.

It is seen that the methods for the manufacture of the agglomerate particles and the separate spray dried particles are known, are commercially feasible and require little special equipment. The products made are free flowing but if desired, can have additional flow promoting clay or other material added to them after or during blending. The products may be used in the normal manner, as are other household and industrial detergent compositions, and it is found that they do not segregate objectionably on storage or shipment and usefully and satisfactorily launder soiled clothing without whitening colors thereof due to any objectionable deposition of zeolite.

The advantages of the products previously mentioned, both the agglomerated ion exchanging zeolite-binder compositions and the final detergent composition containing such components are obtained when employing either crystalline or amorphous zeolites of the types described but in general, for many applications, the amorphous material is highly preferred. Thus, even partially hydrated or completely hydrated amorphous material, despite its normally lower bulk density, e.g., 0.3 g./cc. instead of 0.6 g./cc. for a commerical crystalline molecular sieve zeolite A, can be made into desirable free flowing builder beads of bulk densities in the range of 0.3 to 0.8, e.g., 0.5 to 0.8, and sometimes even higher. Furthermore, the builder beads and detergent compositions containing them, despite the lower ultimate particle sizes of the amorphous material (the aggregate sizes, as supplied, may be about the same) are dust-free. Comparative testings of the abilities of the amorphous and crystalline materials to take up binder materials, such as nonionic detergents, show the amorphous zeolites to be far more efficient. Apparently, the nonionic detergent, in liquid, waxy or greasy form, either in aqueous medium, melted or otherwise made fluid, when not previously fluid, penetrates the ultimate amorphous particle or the aggregated amorphous particle to a significant extent, while not causing the surfaces of such particles to become objectionably tacky, although the zeolite units can agglomerate together to the desired particle size. Thus, the finished detergent builder beads or detergent composition beads may contain desirably large proportions of nonionic detergent, e.g., 5 to 40%, preferably 5 to 25%, normally considered to be an objectionable component of detergent beads in such large quantities because of tackiness and flow problems its presence usually creates. In effect, the amorphous zeolites very efficiently convert liquid, waxy or tacky detergents, such as the nonionic detergents previously described, to free flowing particulate solid bead form and even hydrated amorphous zeolites are surprisingly better in this respect than anhydrous crystalline zeolites. The result is that more nonionic detergent can be present in the detergent composition, with better washing effects and due to the smaller ultimate particle size of the amorphous zeolite less objectionable whitening of dark colored laundry results. Furthermore the amorphous zeolite has better magnesium ion exchanging properties than the corresponding crystalline product, important where magnesium hardness problems are encountered.

Various ways of blending amorphous zeolite and anionic detergent are possible, such as those previously described with respect to detergents and zeolites generally, but the simplest method is merely to mix the two materials together and to continue agitation until the product is sufficiently agglomerated and the detergent-binder is sufficiently sorbed. Of course, instead of using only the detergent as a binder, mixings with other binder materials present too, e.g., pentasodium tripolyphosphate, sodium carbonate, may also be effected.

In a further improvement of the invention a slurry of anionic detergent, such as a 40 to 70%, e.g., 60%, solids content aqueous slurry of sodium linear tridecyl benzene sulfonate, containing about 8% of sodium sulfate and other impurities, is mixed with an equal weight of amorphous ion exchanging zeolite such as that of previously described Belgian patent 835,351. The ion exchanging zeolite has a BET surface area of about 50 to 150 square meters per gram, an ultimate particle size of 0.03 to 0.06 microns, with an aggregate particle size of 0.2 to 10 microns (most of said aggregate being in the 3 to 5 micron range) a density of 2.1 g./cc., a bulk density of 0.3 g./cc., a moisture content corresponding to about 2.5 to 6 mols $H_2O$/mol, an $Na_2O/Al_2O_3/SiO_2$ molar ratio of 1:1:2.1–2.6, a calcium exchange capacity of 260 to 350 mg. $CaCO_3$/g. and a hardness depletion rate residual hardness (mg. $CaCO_3$/gallon) of 0.07 to 0.15 in one minute and less than 0.035 in ten minutes. The mixture of equal weights of both components becomes freely flowable and non-dusty within a short period of mixing, e.g., 1 to 5 minutes. Thus, despite the essentially hydrated state of the amorphous zeolite (containing 20% moisture) and the presence of a significant amount of moisture in the anionic detergent the detergent is made freely flowable without the need for drying thereof. The product made may be of satisfactory high density but low density products can also be produced by various means such as by intentionally mixing gas with the agglomerating materials, as by whipping or use of an effervescent component.

In another aspect of this invention such an amorphous ion exchanging zeolite, which may already include a moisture content of as much as 30%, usually including 10 to 25% or more, may be mixed with various other detergent composition components to produce a free flowing particulate material from such a mixture of other detergent components, even when some of the mentioned components are liquid, and such can be effected without use of heat or drying equipment. Thus, the product made will very often be more readily soluble in wash water and accordingly will be more efficient in washing because the various components thereof will start to act very soon after being added to the wash water, because of rapid particle break-up.

The following examples illustrate the invention but do not limit it. Unless otherwise indicated, all parts are by weight and all temperatures are in °C.

EXAMPLE 1

A readily disintegrable insoluble detergent builder particulate agglomerate of particle sizes in the 8 to 100 mesh range is made from starch and type 4A molecular sieve zeolite in equal proportions so that the agglomerate produced includes such materials in 1:1 ratio. The starch employed is potato starch and the molecular sieve zeolite is of particle sizes within the 2 to 10 micron ultimate diameter range and of the formula $$Na_{12}(AlO_2.SiO_2)_{12}.27H_2O,$$

when completely molecularly hydrated.

The potato starch is dissolved or well dispersed in water, with the proportion of water being about equal to that of the potato starch, and the hydrated molecular sieve zeolite is admixed with the starch-water mix. During this mixing the previously partially hydrated zeolite (20% moisture) is further hydrated, e.g., to 25% moisture content. Excess moisture is evaporated from the mix during agitation and further moisture is removed by heating in a tray dryer until the free moisture content is reduced to about 8%. The agglomerated particles are then size reduced by pressing through a No. 8 screen. Particles that will not pass through the screen are broken up in a grinder and those which are undersized are recycled back to a mixer in which additional starch and molecular sieve zeolite particles are being processed.

The molecular sieve zeolite agglomerate made is a free flowing and form retaining dry solid (containing less than 10% free moisture) but disintegrates almost immediately upon being plunged into wash water. Disintegration into zeolite particles of particle sizes in the 2 to 8.3 micron ultimate particle size range or approaching said range is obtained within about one minute when the agglomerate is added, with agitation, to wash water at 70° C. in an automatic washing machine and such dispersion is obtainable within about 2 minutes at lower temperatures, e.g., 10° C. Thus, when employed with complementary particulate synthetic organic detergent and builder or filler materials a built synthetic detergent washing medium is produced which is quickly and maximally effective as a detergent because the zeolite is quickly available for its calcium exchange function. Also, the insoluble zeolite molecular sieve particles are in such small form that they are not entrapped in openings in the weaves of fabrics being laundered, even if said laundry is line dried or hanger or drip dried, rather than machine dried.

Instead of following the process described above, in a variation thereof the zeolite particles and starch particles are tumbled together in a Day mixer and alternatively, in a Lodige mixer until well blended, after which time 8% of water, by weight of the total of zeolite and starch charged, is sprayed onto the tumbling particles and it is noted that they agglomerate into larger, fairly uniformly sized particles, in the 4 to 180 mesh range, which are then classified to particles of 8 to 100 mesh, which are free flowing and non-caking on storage. In still another variation of the manufacturing method the same formula and the immediately preceding method are employed but instead of screening the particles, etc. after agglomeration, agglomeration is halted at a stage in the process when the particles are substantially within the desired particle size range, 8 to 100 mesh, after which the beads resulting are classified so that all are within the 8 to 100 mesh diameter range. A portion of such product is then blended with an equal weight of sodium perborate beads of diameters in the mentioned range for use as an additive to other detergent components, preferably in spray dried form, to produce a bleaching detergent containing zeolite builder.

EXAMPLE 2

The procedures of Example 1 are repeated but with the different agglomerate formulations given herein:

(A) 25% of corn starch and 75% of 5% hydrated zeolite 4A;

(B) 75% zeolite X, anhydrous, and 25% of a 50:50 mixture of polyvinyl pyrrolidone and polyvinyl alcohol;

(C) 85% of zeolite 4A and 15% of sodium carboxymethyl cellulose;

(D) 50% of zeolite 4A and 50% of corn syrup.

The percentages of moisture in the products of Experiments A, B and C are increased and decreased 50% in both cases compared to those of Example 1 and in Experiment D no more than 10% (usually 0% of added moisture is employed. The products resulting are useful builder agglomerates having the desired properties mentioned for the products of Example 1.

EXAMPLE 3

Particulate agglomerate insoluble builder beads are made by agglomerating in an inclined tube mixer, rotating at 30 revolutions per minute, the following mixtures, all in the presence of an additional 15% of moisture, sprayed into the mixer during the mixing operation. Sufficient agglomeration is obtained within 5 to 10 minutes, as in the experiments of Examples 1 and 2. The products made are sufficiently free flowing and non-tacky so that they can be employed as builder additives for use with other components to produce complete heavy duty built detergent compositions which do not objectionably whiten colored laundry.

(E) 50% zeolite 4A and 50% pentasodium tripolyphosphate;

(F) 50% zeolite 4A, 25% pentasodium tripolyphosphate and 25% corn starch;

(G) 50% zeolite 4A and 50% Neodol 45-11 (condensation product of higher fatty alcohol averaging 14 to 15 carbon atoms per mol with about 11 mols of ethylene oxide);

(H) 50% of zeolite X, anhydrous, 25% of Neodol 45-11 and 25% of potato starch;

(I) 50% of zeolite 4A (10% hydrated), 20% of sodium silicate ($Na_2O$:$SiO_2$=1:2.4), 10% of sodium carboxymethyl cellulose and 20% of corn starch;

(J) 50% of zeolite 4A (15% hydrated), 25% of $Na_2SO_4$ and 25% of $Na_3P_5O_{10}$.

In similar experiments 0.3% of perfume and 0.8% optical brightener are also present in each formula, replacing 1.1% of the zeolites.

EXAMPLE 4

The compositions of Examples 1-3 are varied in proportions so that the contents of zeolites are 30%, 50% and 70%, respectively, in each case, with the percentages of other constituents being proportionally adjusted accordingly. The products made are useful particulate agglomerate builder beads, suitable for addition to beads of complementing detergent composition components to make heavy duty built synthetic organic detergents which do not objectionably whiten dyed fabrics washed with them and line dried. When, in such products, the mentioned zeolites are replaced by mixtures of zeolites, e.g., 50:50 mixtures of zeolite 4A and zeolite X, anhydrous, partially hydrated or completely hydrated, useful builder agglomerate particles are also produced. Similarly, when in place of zeolite 4A and/or zeolite X (zeolites Y and L may also be substituted) there are employed those of the previously mentioned Austrian, German and U.S. patents, acceptable products of improved characteristics are also produced, which act faster to tie up calcium ion in the wash water and deposit less insoluble zeolite builder on laundry being washed than results from spray drying the complete formulation.

EXAMPLE 5

A spray dried detergent composition of particle sizes in the 8 to 100 mesh range is made by spraying into a countercurrent tower having drying air at a temperature of 250° C. passing through it, a 65% solids content aqueous crutcher mix at a temperature of 70° C. and a spraying pressure of about 400 lbs./sq. in., through spray nozzles of 1 mm. dia. The holdup time in the spray tower is long enough, usually being about five minutes, to dry the beads to a moisture content of about 11%. The beads produced are of the formula:

| Constitutents | Percentage |
|---|---|
| Sodium linear tridecylbenzene sulfonate | 15 |
| Pentasodium tripolyphosphate | 32 |
| Sodium sulfate | 31.8 |
| Sodium silicate ($Na_2O:SiO_2$ = 1:2.35) | 7 |
| Polyethoxylated alcohol (Neodol 45-11) | 1 |
| Borax (as $Na_2B_4O_7.10\ H_2O$) | 1 |
| Preservative | 0.01 |
| Sodium carboxymethyl cellulose | 0.3 |
| Perfume | 0.2 |
| Fluorescent brighteners (mixture) | 0.7 |
| Moisture | 11 |

With the above described spray dried separate particles of the detergent composition are separately admixed sufficient of the various agglomerates described in Example 1 to produce a plurality of detergent products, each containing 20% of the zeolite. 20% Zeolite content is a preferred percentage but such amount is modified so as to also produce the corresponding products containing 10% and 30% of the molecular sieve zeolites. Soiled, mixed laundry, including cotton and polyester-cotton blend fabrics soiled with clayey, carbonaceous and oil materials, are washed in 150 p.p.m. hardness (3:2 $Ca^{++}$:$Mg^{++}$ hardness, as $CaCO_3$) at 0.15 and 0.25% concentrations in wash water at washing temperatures of 30°, 50° and 70° C. and such washings result in good cleanings of the laundry when using the automatic washing cycle of conventional top loading and side loading household automatic washing machines. Particularly important is the low deposition of the insoluble builder on dyed fabrics being washed, especially on light blue dyed percale which is line dried, considered to be an extreme test of such deposition. The products described, heavy duty detergents containing readily disintegrable agglomerate particles of molecular sieve zeolite builder, are of acceptable properties for a commercial product, being sufficiently free flowing and non-caking on storage to meet with acceptance by the normal user thereof and quickly sequestering hardness ions in wash waters to promote cleaning, while still not depositing objectionably on dyed materials. When the other agglomerate particles of Examples 2–4 are substituted for those of Example 1 in the built detergent compositions described in this example similar acceptable results are obtained. This is also so when for the sodium linear alkyl bensene sulfonate of the formula there are substituted the olefin sulfonate, paraffin sulfonate, ethoxylate sulfate and other anionic detergents previously described and when the different binders and combinations thereof mentioned are employed in the same and different amounts within the ranges given.

EXAMPLE 6

The experiments of Example 5 are repeated but instead of using the phosphate-containing detergent composition for the separate particles a non-phosphate detergent of the following formula is used instead (final product formula given).

| Constituent | Percentage |
|---|---|
| Sodium linear dodecylbenzene sulfonate | 20 |
| Zeolite 4A (20% hydrated) | 25 |
| Potato starch | 9 |
| Sodium carboxymethyl cellulose | 1 |
| Sodium carbonate | 13 |
| Sodium sulfate | 15 |
| Moisture | 5 |
| Adjuvants (perfume, colorant, optical brighteners, flow promoting agent, bactericide, stabilizer) | 5 |
| Sodium silicate ($Na_2O:SiO_2$ = 1:2.4) | 7 |

The zeolite, carbonate, starch and half the CMC are in the agglomerate particles, with the other materials being in the separate beads.

Although in the absence of the phosphate the detergency is not as good as it is for the products of Example 5 cleaning results obtained are acceptable and are better than when the molecular sieve zeolite is omitted from the formula. When changes are made in the molecular sieve zeolite and the binder materials and when the proportions of some of the materials are altered between the agglomerate particles and the separate particles (usually keeping the carbonate with the agglomerate particles) within the described scope of this invention good detergents of acceptable washing and non-deposition characteristics result. Thus it is established that non-phosphate detergents of satisfactory cleaning powers can be made without having the insoluble molecular sieve zeolite unsatisfactorily deposit on colored materials. The products made are non-segregating when subjected to storage and shipment. They are also non-dusting (as are those of the previous examples).

In variations of the product of Example 6, to 100 parts of the finished product are added 40 parts of sodium perborate or 30 parts of sodium perborate plus 0.5 part of suitable activator for the perborate and washing and bleaching are effected in the washing machine at elevated temperature (e.g., 80° C.). In such cases good washing and bleaching of hard to remove stains such as red wine, coffee, tea and cocoa are obtained, especially with the activated perborate bleach and similar results are obtained when instead of the perborate an equivalent amount of percarbonate or activated peroxymonosulfate is employed. An additional advantage of the present invention in the case of bleaching detergent compositions is in the apparent sorption by the finely divided molecular sieve zeolite of any fugitive dye released by the colored laundry, preventing it from redepositing on white articles laundered with the colored materials. In another modification of the formula, instead of perborate, capsules of sodium bicarbonate and citric acid are employed, with such reactive solids being maintained separate from one another and dry so that they interact only when the capsules are broken on being plunged into water. Such capsules are preferably utilized with the agglomerate particles but may be mixed with the agglomerate and/or separate particles providing that they are of the same particle size so as to prevent settling. They effervesce and promote rapid breakup and mixing of the components of the composition. Of course, in built alkaline compositions, when carbonate is present, the citric acid or other acidifying agent should be maintained close to the bicarbonate so as to be able to react with it to generate carbon dioxide gas before the acid is neutralized by other alkali in the wash water. When alkaline builders are omitted from the detergent composition the dry reactive effervescing ingredients may be separately present in the different beads (one in the agglomerate and the other in the separate beads).

In still other modifications of the product, instead of being produced in bead form, flakes or granules of the components may be made, in which cases the products are equally good as detergents and in not depositing molecular sieve zeolite on washed laundry although flow characteristics are not quite as good. Builders other than the zeolites may be omitted and anhydrous sodium sulfate in the agglomerate and/or separate particles may be hydrated in the manufacture of the product to remove excess free moisture.

EXAMPLE 7

The experiments of Examples 1-6 are all repeated but instead of the crystalline zeolites utilized therein there is substituted an amorphous zeolite of the type described in Belgian patent 835,351. The material utilized is obtained from J. M. Huber Corp. and is of the formula given at page 11 of this specification and of the properties described at pages 36 and 37. In other variations of the formulas of Examples 1-6 half of the crystalline zeolite is replaced by said amorphous zeolite. The final products made are of detergencies like those of the corresponding final compositions of Examples 1-6 and are considered to be more effective in hard waters containing substantial proportions of magnesium hardness, in addition to calcium hardness. The products are dryer, especially the amorphous zeolite-binder builders, are more free flowing, less inclined toward tackiness and are also dust free. Also, less deposition of the insoluble zeolite on washed dark colored laundry results, even when washing is effected in cold water and the laundry is line dried, probably due to smaller sizes and more rounded configurations of the amorphous particles. Especially when nonionic detergents are employed as binder materials the builder particles of this invention are made of a wide variety of bulk densities, including those within the range of 0.3 to 0.8 g./cc. and even higher, depending on binder and moisture contents and mixing times. In some instances, due to the sorbing power of the amorphous zeolites described additional moisture will be employed in the formulas of Examples 1-6, as modified for the purpose of this example. Thus, especially when moisture contents of the amorphous zeolites are lower than 30%, e.g., 10, 20 and 25%, rather than 30% as is present in the Huber zeolite mentioned, more water, about 1.5 times the amount previously described, will be used in making the starch-water mixture of Example 1 and any subsequent drying steps may be omitted.

Utilizing the amorphous zeolite modifications of this example allows substantial disintegration of the zeolite-binder particles into zeolite particles of ultimate particle sizes in the 0.03 to 0.06 micron size range within about a minute after the agglomerate is added into the hot wash water with agitation.

In the alternative processes of Example 1 instead of utilizing 8% of water in the spray, as much as 30% may sometimes be employed, with the preferred range being from 10 to 25%. In the modifications of the rest of the examples moisture contents described therein may be employed but normally such contents are increased by amounts from 10 to 50% thereof because the amorphous zeolite is being used.

The products of Example 7 (and also of Examples 1-6) which contain alkaline builder salts such as sodium carbonate or sodium tripolyphosphate will usually have a pH in the range of 9 to 11, preferably 9.5 to 10.5 whereas those builder particles containing no alkaline material except for the zeolite will usually have a pH within the 7.5-10 range, normally 8-9.5. Thus, the detergent composition pH's will be in the best range for good washing and suitable mildness to the materials being washed and to the hands of the user and, if desired, the binder particles may still be of sufficiently high pH to faciltate washing. Such pH's will generally be from 7.5-11, preferably 9.5-10.5.

Athough the amorphous compositions are superior to those containing only crystalline zeolites of the types described, such superiority is most significant in the cases wherein nonionic surface active agents or builder salts or mixtures thereof are employed as binders. The builder particles so made and the detergent compositions including them are the best commercially feasible products and a large measure of their acceptability is due to the use of amorphous, rather than crystalline zeolites.

EXAMPLE 8

In an extension of the concept of this invention, arising out of the discovery of the unusual beneficial effects of the amorphous zeolite in improving the properties of detergent compositions in which it is incorporated in place of crystalline zeolite as an insoluble builder, it was discovered that good detergent compositions could be based essentially on only synthetic organic detergent, such as an anionic or nonionic detergent and the amorphous zeolite, preferably with an alkalizing agent such as alkaline builder salt, e.g., sodium carbonate, pentasodium tripolyphosphate, also being present. Such materials are described in this example.

| | Percent |
|---|---|
| Neodol 45-11 (100% active ingredient) | 50 |
| Amorphous zeolite (type described in Example 7, manufactured by J. M. Huber Corp.) | 50 |

The zeolite powder is added with stirring to the waxy nonionic detergent at a temperature of about 30° C. (but similar mixings are effected at temperatures of 20° C., 25° C. and 35° C. or higher and while mixing is taking place the waxy nonionic becomes sorbed by the zeolite particles, despite its considerable viscosity, producing a powdered composite which is free flowing and of desired particle size in the 4 to 180 mesh range. This material is classified and product in the 8 to 100 mesh range is separated and tested as a detergent. It is a good detergent, washing soiled clothes satisfactorily in laboratory and practical laundry tests. It does not objectionably whiten dark colored items nor does it make them stiff or boardy. The product is free flowing and maintains this characteristic on storage. Its bulk density is in the 0.4 to 0.6 g./cc. range but this is then increased and agglomeration into larger particles is then effected by further mixing, especially using a water spray in amount from 10 to 30% of the weight of the final product.

In variations of this experiment Neodol 25-7 is substituted for Neodol 45-11 and similar results are obtained. Desirably, when the nonionic detergent is the only active synthetic organic detergent material present the proportion thereof in the final composition will be from 10 to 60%, preferably 20 to 50%.

In another variation of this example a slurry of anionic detergent is converted to free flowing powdered form.

| | |
|---|---|
| Sodium linear tridecyl benzene sulfonate slurry (60% active ingredient, 9% sodium sulfate and other impurities and 31% water) | 50 |
| Amorphous zeolite (as above) | 50 |

The powdered amorphous zeolite is admixed with the aqueous slurry of anionic detergent and soon, within five minutes, free flowing particulate product results, of the particle sizes previously mentioned. It is classified or further agglomerated to a desired 8–100 mesh range of particle sizes and is tested and found satisfactory as a detergent, cleaning laundry well and not objectionably depositing insoluble white particles thereon. Clearly, an advantage of this process is in energy conservation because the use of a spray drying tower is not required to manufacture a flowable particulate solid product.

In both the nonionic and anionic formula processes described in this example 10, 20, 30 and 40 parts of pentasodium tripolyphosphate, sodium carbonate or an equal mixture thereof are also utilized with 100 parts of the formulas previously given, the soluble builder salt being present pre-mixed with the zeolite or post-mixed with the zeolite-detergent powder. Improved detergency results due to the presence of the additional builder and flowability and other physical properties are also satisfactory.

In a further variation of this experiment the other amorphous zeolites previously mentioned are utilized and satisfactory results, comparable to those previously described, are obtained.

In comparative examples wherein type A molecular sieve zeolite (crystalline) is employed in place of the amorphous zeolites described the products resulting are pasty and never become satisfactorily flowing.

EXAMPLE 9

This example illustrates an aspect of the invention discovered after the excellent building and flow improving effects of the described amorphous ion exchanging zeolites were noted. In the formula given commercially acceptable non-dusting, non-tacky free flowing, useful heavy duty detergents are produced, which may, if desired, be low in phosphate content or free thereof. Such products may be manufactured at desirable comparatively high bulk densities, making it possible to market them in smaller packages and may be based on hitherto unacceptably sticky nonionic detergents (unacceptable in comparatively large proportions, e.g., 10 or 15 to 50%).

| | Formulations and Percentages | | | | | | | | | | | | | |
|---|---|---|---|---|---|---|---|---|---|---|---|---|---|---|
| Ingredients | 1 | 2 | 3 | 4 | 5 | 6 | 7 | 8 | 9 | 10 | 11 | 12 | 13 | 14 |
| Neodol 25-7 | 20 | 20 | 20 | 20 | 20 | 20 | | 20 | | | | | 20 | 20 |
| Neodol 45-11 | | | | | | | | | | | 20 | 20 | | |
| Sodium linear tridecyl benzene sulfonate | | | | | | | 30 | | 30 | 30 | | | | |
| Amorphous zeolite (Huber, as previously described) | 20 | 20 | 20 | 40 | 20 | 20 | | 10 | 10 | 10 | 10 | 10 | 10 | 10 |
| $Na_2CO_3$ | 10 | 10 | 10 | 10 | 10 | | | | | | | | | |
| $NaBO_3.4H_2O$ | 10 | 10 | 10 | 10 | 10 | 10 | | | | | | | | |
| Sodium silicate ($Na_2O:SiO_2 = 1:2$) | 10 | 10 | 10 | 10 | 10 | 9 | 9 | 9 | 9 | 9 | 9 | 9 | 9 | |
| Sodium carboxymethyl cellulose | 2 | 2 | 2 | 2 | 2 | 1 | 1 | 1 | 1 | 1 | 1 | 1 | 1 | 1 |
| $Na_2SO_4$ | 28 | 8 | 23 | 8 | | | | | | | | | | |
| Crystalline zeolite type 4A (Huber as previously described) | | 20 | | | 20 | 10 | 60 | 60 | 50 | 40 | 60 | 50 | 50 | 60 |
| Methyl cellulose (Dow) | | | 5 | | | | | | | | | | | |
| $NaHCO_3$ | | | | | 8 | | | | | 10 | | 10 | 10 | |
| Hydrous silicate (Huber, $Na_2O:SiO_2 = 1:2.4$) | | | | | | | | | | | | | 9 | |
| Pentasodium tripolyphosphate | | | | | | 30 | | | | | | | | |
| Bulk density, g./cc. | 0.8 | 0.7 | 0.7 | 0.5 | 0.7 | 0.7 | 0.6 | 0.7 | 0.5 | 0.6 | 0.8 | 0.8 | 0.8 | 0.8 |

The various constituents listed are mixed together in powdered form, such powders usually being of mesh sizes in the range of 8 to 325, U.S. Standard Sieve Series, and are sufficiently mixed so that the synthetic organic detergent is dispersed and it and any other waxy or sticky materials which may not be in powder form are sorbed or otherwise made free flowing by the amorphous zeolite and other powdered constituents present. All the products resulting which contain nonionic detergent are free flowing, non-tacky, dust-free detergent powders and all possess satisfactory washing properties for a built synthetic organic detergent.

To diminish any dusting of the present compositions, particularly those containing anionic synthetic organic detergent, the various components thereof, except for heat-sensitive materials such as the sodium perborate tetrahydrate, may be spray dried and the heat sensitive compounds may be post-added. The compositions based on nonionic synthetic organic detergent may also have a portion thereof spray dried initially and then blended with a mix of the balance of the material. For example, in formulation 1, the carbonate, silicate, CMC and sodium sulfate may be spray dried together to form beads of particle size in the 4 to 180 mesh range, which are then blended with a previously made mixture of Neodol 25-7, amorphous zeolite and sodium perborate tetrahydrate or the Neodol 25-7 may be sprayed onto a tumbling mass of the other materials. It is noted that the absence of sodium linear tridecyl benzene sulfonate from the spray dried component makes it a better sorbent for the nonionic detergent. In all formulas, other adjuvants, such as perfumes, colorants, enzymes, may be post-added. They may be incorporated in crutcher mixes before spray drying or with other components being pre-mixed. In some cases, portions of the components may be spray dried and other portions of the same components may be pre-mixed with other materials, with the two or more parts then being mixed to make a final product.

It is noted that the products made are of bulk densities in the range of 0.5–0.8 g./cc. but products of bulk densities in the 0.3 to 0.9 range are also obtainable. It is also observed that the presence of nonionic detergent tends to increase the bulk density of the product, compared to compositions wherein anionic detergent is employed. Bulk density may be adjusted by using more or less of spray dried materials, with greater quantities thereof lowering the bulk density.

It is seen from the formulations given that satisfactory comparatively high bulk density detergent powders can be made of satisfactory flow and detergency characteristics without the use of phosphates, by employing amorphous zeolite as a builder, preferably with nonionic, rather than anionic detergent.

The products containing amorphous zeolite are superior in magnesium exchanging capability to those containing similar proportions of crystalline zeolite (molecular sieves) and are less apt to deposit objectionably on dark colored laundry. Other builder salts than the zeolite are desirable components of these compositions but they are not required, although silicates are usually desirably present, especially for their anti-corrosion properties. If desired, supplementary organic builder may be utilized, such as citrates, gluconates, trisodium carboxymethyloxysuccinate, and Monsanto's Builder M, trisodium-2-oxa-1,1,3-propane tricarboxylate. Normally the products resulting will have a pH in the range of 8 to 11, preferably 9.5 to 10.5 and particle sizes will be from 10 to 200 mesh. Yet, despite the fineness of the particles they are non-dusting and free flowing, capable of being poured from a narrow-necked bottle or similar container. (With crystalline zeolite being used instead of amorphous zeolite the product is not as free flowing, especially when it also contains waxy or pasty nonionic detergent.

Results like those reported are generally obtainable when the content of the nonionic detergent is in the range of 10 to 60%, preferably 20 to 40% and that of the amorphous zeolite is in the same range, with the proportions being complementary or less than complementary. Proportions of water soluble builder salt will generally be from 10 to 50%, preferably 15 to 40%. The ratio of nonionic detergent:amorphous zeolite is in the range of 1:3 to 3:1, preferably 1:2 to 2:1 and that of amorphous zeolite:water soluble builder salt is infinity to 1:4, preferably 3:1 to 1:3. When crystalline zeolite is also present, e.g., at 10 to 60%, the ratio of its content to that of amorphous zeolite is 6:1 to 1:10, preferably 3:1 to 1:3. Free moisture will normally be less than 15%, preferably less than 10% and most preferably less than 5%, to promote flowability. However, the zeolites do contain additional water of hydration, with such content normally being about 20% for the crystalline material and 20–30% for the amorphous material. When crystalline zeolite is present the proportion of total zeolite may be increased to as much as 80% but preferably this will be held to 60% or less.

Results similar to those reported for this example are also obtained when the amorphous zeolite or amorphous-crystalline zeolite mixtures used are replaced by the other such materials mentioned in this specification and when other mentioned nonionic detergents and builders are substituted.

By means of the present invention there is obtained a non-dusting, desirably sized, non-segregating, attractive detergent composition containing synthetic organic detergent and ion exchanging zeolite builder which washes effectively and which possesses significant advantages over similar spray dried formulations, especially with respect to absence or diminution of depositing of zeolite on colored fabrics that are laundered and line dried. However, the invention is also additionally useful because there is produced a particulate zeolite builder agglomerate which can be added, as desired, to the balances of the spray dried detergent formulations, wherein it promotes flowability and contributes the building effect of the ion exchanging zeolite. Keeping the zeolite separate from the bulk of the detergent formulation allows ready adjustment of such formulation to include more or less of the zeolite builder, as may be desired, and thus gives greater flexibility of manufacturing plant operation. Required tower throughput, sometimes a bottleneck in production, is lowered and sometimes is nil, allowing greater production rates. While changings of the spray dried formulas to allow modifications of the end products, as in changing phosphate contents from 35% STPP to 25%, 15% or 0%, may be effected by changing tower operations and modifying the proportion of agglomerate particles used, in some instances the formula may be modified merely by changing the proportion of agglomerate particles employed and/or the types of agglomerates used. In those instances wherein nonionic detergents or anionic detergent slurries are "solidified" by use of amorphous zeolite, detergent-builder products are made without the need for any spray drying at all and use of the amorphous zeolites in such products further diminishes any tendency to whiten dark colored laundry with the detergent compositions.

The invention has been described with respect to various illustrations and embodiments thereof but is not to be limited to these because it is evident that one of skill in the art, with the present specification before him, will be able to utilize substitutes and equivalents without going outside the scope of the invention.

What is claimed is:

1. A readily disintegratable insoluble detergent builder particulate agglomerate comprising about 50% by weight of hydrated zeolite 4A having a particle diameter of about 0.01 to 10 microns, to about 20% by weight of sodium silicate having a $Na_2O$:$SiO_2$ ratio of about 1:2.4, about 10% by weight of sodium carboxymethylcellulose and about 20% by weight of corn starch, wherein the zeolite is combined with the sodium silicate, sodium carboxymethylcellulose and corn starch in the presence of about 15% by weight water.

2. A readily disintegratable insoluble detergent builder agglomerate comprising about 50% by weight initially anhydrous zeolite X, having a particle diameter in the range of from about 0.01 to 10 microns, about 25% by weight of a nonionic surfactant, said nonionic surfactant being an ethoxylation product of a 14 to 15 carbon atom chain fatty alcohol, having an average of 11 ethylene oxide units; and about 25% by weight of potato starch; wherein the zeolite is combined with the nonionic surfactant and potato starch in the presence of about 15% by weight water.

* * * * *

UNITED STATES PATENT AND TRADEMARK OFFICE

CERTIFICATE OF CORRECTION

PATENT NO. : 4,414,130

DATED : November 8, 1983

INVENTOR(S) : B. Cheng

It is certified that error appears in the above-indentified patent and that said Letters Patent is hereby corrected as shown below:

Col. 15, line 15

After "2" delete "L"

Col. 16, line 42

Change "0.07" to --700--

Change "0.15" to --1500--

Col. 16, line 43

Change "0.035" to --350--

Signed and Sealed this

Thirteenth Day of July, 1993

Attest:

Michael K. Kirk

MICHAEL K. KIRK

*Attesting Officer*

*Acting Commissioner of Patents and Trademarks*